US008774806B2

(12) United States Patent
Liu et al.

(10) Patent No.: US 8,774,806 B2
(45) Date of Patent: Jul. 8, 2014

(54) APPARATUS FOR REGISTERING MEDIA INDEPENDENT HANDOVER AND METHOD USING THE SAME

(75) Inventors: Xiaoyu Liu, Yongin-si (KR); Su Won Lee, Seongnam-si (KR); Jeong Jae Won, Hwaseong-si (KR); Eui Seok Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1130 days.

(21) Appl. No.: 11/882,361

(22) Filed: Aug. 1, 2007

(65) Prior Publication Data

US 2008/0096558 A1 Apr. 24, 2008

Related U.S. Application Data

(60) Provisional application No. 60/853,429, filed on Oct. 23, 2006.

(30) Foreign Application Priority Data

Feb. 26, 2007 (KR) ........................ 10-2007-0018966

(51) Int. Cl.
*H04W 36/00* (2009.01)
(52) U.S. Cl.
USPC .......................................... 455/436; 370/331
(58) Field of Classification Search
USPC .................................. 455/435.2, 436; 370/331
See application file for complete search history.

(56) References Cited

U.S. PATENT DOCUMENTS

| 6,636,522 | B1 * | 10/2003 | Perinpanathan et al. ...... 370/409 |
| 2005/0249161 | A1 | 11/2005 | Carlton |
| 2006/0099948 | A1 | 5/2006 | Hoghooghi et al. |
| 2006/0140150 | A1 | 6/2006 | Olvera-Hernandez et al. |
| 2006/0187881 | A1 | 8/2006 | Kwak et al. |
| 2006/0274697 | A1 * | 12/2006 | Kim et al. ..................... 370/331 |
| 2007/0183365 | A1 * | 8/2007 | Ohba et al. ................... 370/331 |
| 2007/0265008 | A1 * | 11/2007 | Feder et al. ................... 455/436 |

FOREIGN PATENT DOCUMENTS

| KR | 10-2006-0092789 A | 8/2006 |
| KR | 1020060092528 A | 8/2006 |
| KR | 1020060102775 A | 9/2006 |
| KR | 1020060106529 A | 10/2006 |
| KR | 1020060107717 A | 10/2006 |

OTHER PUBLICATIONS

Extended European Search Report issued Sep. 30, 2011, in counterpart European Application No. 07833333 (5 pages).

(Continued)

*Primary Examiner* — Amancio Gonzalez
(74) *Attorney, Agent, or Firm* — NSIP Law

(57) ABSTRACT

A method and apparatus for registering a Media Independent Handover (MIH) is provided. An MIH registration method includes transmitting, by a serving network, an MIH registration request of the serving network to at least one candidate network when an MIH registration request is received from a mobile terminal, the at least one candidate network corresponding to the serving network, receiving, by the serving network, a response to the MIH registration request of the serving network from each of the at least one candidate network, and transmitting, by the serving network, a response to the MIH registration request of the mobile terminal to the mobile terminal.

19 Claims, 6 Drawing Sheets

(56) References Cited

OTHER PUBLICATIONS

Dutta, Ashutosh, et al., "Seamless Handoff across Heterogeneous Networks—An 802.21 Centric Approach", International Symposium on Wireless Personal Multimedia Communications, Sep. 18, 2005, XP55007678, Aalborg, Denmark.

"Draft IEEE Standard for Local and Metropolitan Area Networks: Media Independent Handover Services", Draft IEEE Standard for Local and Metropolitan Area Networks, Jan. 1, 2006, pp. 1-169, vol. P802.21/D00.05, XP003019188, IEEE, US.

Korean Office Action mailed Oct. 29, 2013 in counterpart Korean Application No. 10-2007-0018966 (4 pages, in Korean).

* cited by examiner

US 8,774,806 B2

APPARATUS FOR REGISTERING MEDIA INDEPENDENT HANDOVER AND METHOD USING THE SAME

CROSS-REFERENCE TO RELATED APPLICATIONS

This application claims the benefit under 35 U.S.C. §119 (e) of an U.S. Provisional Application No. 60/853,429, filed on Oct. 23, 2006, in the U.S. Patent and Trademark Office, and under 35 U.S.C. §119(a) of a Korean Patent Application No. 10-2007-0018966, filed on Feb. 26, 2007, in the Korean Intellectual Property Office, the entire disclosures of both of which are hereby incorporated by reference.

BACKGROUND OF THE INVENTION

1. Field of the Invention

The present invention relates to a Media Independent Handover (MIH). More particularly, the present invention relates to a method and apparatus for performing an MIH registration between a Media Independent Handover Function (MIHF) of a serving network and MIHFs of candidate networks.

2. Description of Related Art

An Institute of Electrical and Electronics Engineers (IEEE) 802.21 standard is advancing international standardization of a Media Independent Handover (MIH) for the purpose of providing service continuity and seamless handover between heterogeneous networks and thereby providing user convenience with a mobile terminal.

An MIH registration procedure should be performed to enable communication between a Media Independent Handover Function (MIHF) of a mobile terminal and an MIHF of a serving network. In this instance, the serving network indicates a network which directly connects with the mobile terminal.

When the MIHF of the mobile terminal transmits an MIH registration request to the MIHF of the serving network, the MIHF of the serving network transmits a response to the MIH registration request to the MIHF of the mobile terminal. Through the above operation, the MIH registration procedure between the mobile terminal and the serving network is performed.

A conventional MIH registration procedure should deregister a registered identifier and register a new identifier when an access point (AP), connected between the MIHF of the mobile terminal and the MIHF of the serving network, is changed. Specifically, every time an AP is changed, a registration procedure of deregistering a registered identifier and registering a new identifier should be repeated. Accordingly, it generally takes a great amount of time to perform the MIH registration between the MIHF of the mobile terminal and the MIHF of the serving network.

Accordingly, there is a need for an apparatus which can define a registration procedure between networks and thereby perform communication between the networks.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to define a registration procedure between an MIHF of a serving network and MIHFs of candidate networks corresponding to the serving network, and thereby, perform communication between the serving network and the candidate networks.

An aspect of exemplary embodiments of the present invention is to perform a re-registration procedure of an identifier between an MIHF of a mobile terminal and an MIHF of a serving network when an access point (AP) is changed.

An aspect of exemplary embodiments of the present invention is to perform a re-registration procedure of an identifier between an MIHF of a mobile terminal and an MIHF of a serving network and thereby reduce a registration time between the MIHF of the mobile terminal and the MIHF of the serving network.

According to an aspect of exemplary embodiments of the present invention, there is provided a method of registering an MIH, the method including transmitting, by a serving network, an MIH registration request of the serving network to at least one candidate network when an MIH registration request is received from a mobile terminal, the at least one candidate network corresponding to the serving network, receiving, by the serving network, a response to the MIH registration request of the serving network from each of the at least one candidate network, and transmitting, by the serving network, a response to the MIH registration request of the mobile terminal to the mobile terminal.

In exemplary embodiments of the present invention, the serving network may transmit transmission information to the mobile terminal. In an aspect of exemplary embodiments of the present invention, the transmission information includes information about transmission of the MIH registration request of the serving network to the at least one candidate network.

In an aspect of exemplary embodiments of the present invention, the response to the MIH registration request of the mobile terminal may include a response of the serving network to the MIH registration request of the mobile terminal and a response of the at least one candidate network to the MIH registration request of the serving network.

In an aspect of exemplary embodiments of the present invention, the MIH registration method further include receiving, by the serving network, a re-registration request of a current identifier from the mobile terminal when an access point connecting with the mobile terminal is changed.

In an aspect of exemplary embodiments of the present invention, access points before and after a connection with the mobile terminal is changed may be served by identical serving Point of Service (POS).

In an aspect of exemplary embodiments of the present invention, the MIH registration method may further include receiving, by the serving network, a re-registration request of identifiers associated with the MIH registration of the mobile terminal, from the mobile terminal, when the MIH registration of the mobile terminal and a lifetime of the identifiers associated therewith are expired.

According to another aspect of exemplary embodiments of the present invention, there is provided an apparatus for registering an MIH, the apparatus including a request transmitter for transmitting an MIH registration request of the serving network to at least one candidate network when an MIH registration request is received from a mobile terminal, the at least one candidate network corresponding to the serving network, a response receiver for receiving a response to the MIH registration request of the serving network from each of the at least one candidate network, and a response transmitter for transmitting a response to the MIH registration request of the mobile terminal to the mobile terminal.

In an aspect of exemplary embodiments of the present invention, the MIH registration apparatus may further include a request receiver for receiving a re-registration request of a current identifier from the mobile terminal when an access point connecting with the mobile terminal is changed.

In an aspect of exemplary embodiments of the present invention, the MIH registration apparatus may further include a request receiver for receiving a re-registration request of identifiers associated with the MIH registration of the mobile terminal, from the mobile terminal, when the MIH registration of the mobile terminal and a lifetime of the identifiers associated therewith are expired.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
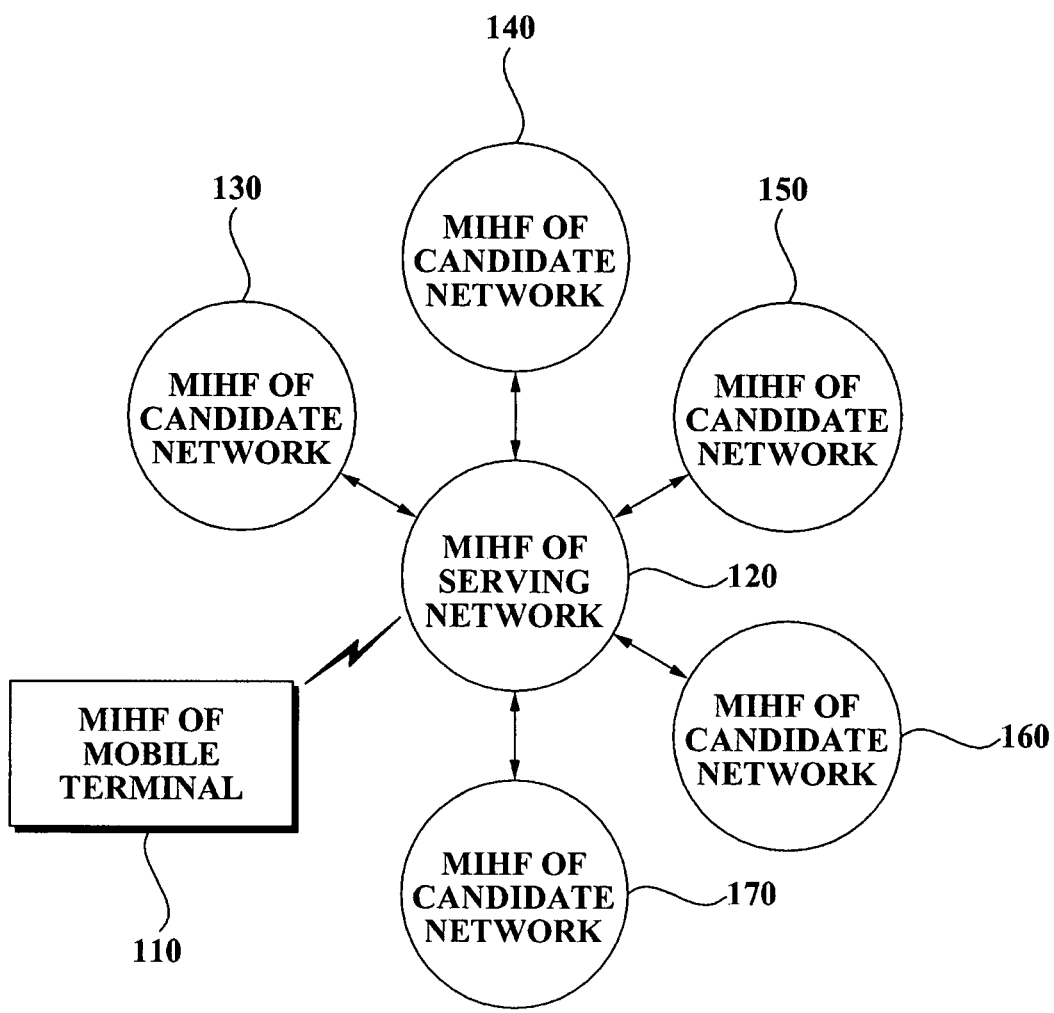
FIG. 1 illustrates a system diagram for describing an MIH registration apparatus according to an exemplary embodiment of the present invention.

FIG. 1 illustrates a system diagram for describing a Media Independent Handover (MIH) registration apparatus according to an exemplary embodiment of the present invention.

Referring to FIG. 1, a system includes a mobile terminal, a serving network, and a plurality of candidate networks. Specifically, the system includes a Media Independent Handover Function (MIHF) of the mobile terminal 110, an MIHF of the serving network 120, and MIHFs of the plurality of candidate networks 130, 140, 150, 160, and 170.

In an exemplary embodiment of the present invention, the MIHF of the mobile terminal 110 requests the MIHF of the serving network 120 for an MIH registration of the mobile terminal.

Also, when an access point (AP) connecting with the mobile terminal is changed, the MIHF of the mobile terminal 110 may request the MIHF of the serving network 120 for a re-registration of a current identifier. Specifically, the MIH of the mobile terminal 110 requests, due to the change of the AP, the MIHF of the serving network 120 for the re-registration of the current identifier without performing a deregistration procedure of the current identifier and also without performing a registration procedure of a new identifier. Accordingly, it is possible to reduce a resource consumption and identifier registration time. In this instance, for the re-registration of the current identifier according to the change of the AP, an AP before the change and an AP after the change should be served by a serving Point of Service (POS). Specifically, APs before and after a connection with the mobile terminal is changed should be served by the same MIHF.

When the APs before and after the connection with the mobile terminal is changed are not served by the same serving POS, the deregistration procedure of the current identifier and the registration procedure of the new identifier should be performed.

In an exemplary embodiment of the present invention, when the registration and a lifetime of identifiers associated with the registration is expired, the MIHF of the mobile terminal 110 may periodically request the MIHF of the serving network 120 for a re-registration of the identifiers.

Also, the MIHF of the mobile terminal 110 may perform a registration procedure with an MIHF of a candidate network, which the mobile terminal moves to among the MIHFs of the candidate networks 130 through 170, that is, with an MIHF of a predetermined target network selected by the mobile terminal. In this instance, the MIHF of the mobile terminal 110 performs the registration procedure with the MIHF of the target network via the MIHF of the serving network 120.

When the MIH registration request is received from the MIHF of the mobile terminal 110, the MIHF of the serving network 120 performs the MIH registration procedure between the MIHF of the serving network 120 and the MIHFs of the candidate networks 130 through 170 corresponding to the serving network.

Specifically, the MIHF of the serving network 120 transmits the MIH registration request of the serving network to the MIHFs of the candidate networks 130 through 170, and receives a response to the MIH registration request of the serving network from each of the MIHFs of the candidate networks 130 through 170.

When the response to the MIH registration request of the serving network is received from each of the MIHFs of the candidate networks 130 through 170, the MIHF of the serving network 120 transmits a response to the MIH registration request of the mobile terminal to the mobile terminal.

In an exemplary embodiment of the present invention, the response to the MIH registration request of the mobile terminal may include a response of the serving network to the MIH registration request of the mobile terminal and a response of each of the candidate networks to the MIH registration request of the serving network.

Also, when a re-registration request of a current identifier is received from the MIHF of the mobile terminal 110, the MIHF of the serving network 120 may transmit a response to the re-registration request of the identifier to the MIHF of the mobile terminal 110.

Each of the MIHFs of the candidate networks 130 through 170 receives the MIH registration request of the serving network from the MIHF of the serving network 120, and transmits a response to the MIH registration request of the serving network to the MIHF of the serving network 120.

Also, the MIHF of the target network, which the mobile terminal moves to among the MIHFs of the candidate networks 130 through 170, may pre-register the MIHF of the mobile terminal 110. Specifically, when the mobile terminal moves to a new network corresponding to a target network, it takes time to perform a registration procedure between an MIHF of the target network and the MIHF of the mobile terminal 110. Accordingly, it is effective to pre-register the MIHF of the mobile terminal 110 in the MIHF of the target network before moving to the target network.

In an exemplary embodiment of the present invention, the registration procedure between the MIHF of the mobile terminal 110 and the MIHF of the target network may be performed via the MIHF of the serving network 120.

Figure 2:
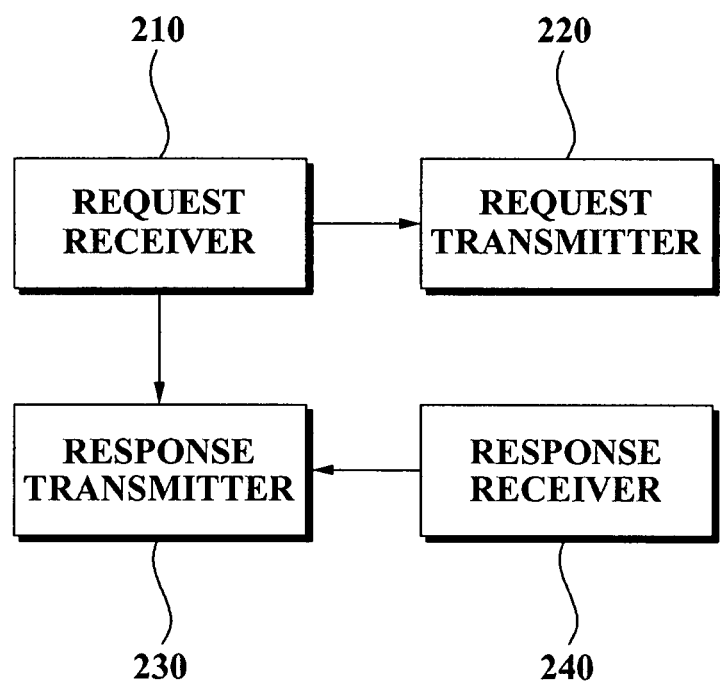
FIG. 2 is a block diagram illustrating a configuration of an MIH registration apparatus according to an exemplary embodiment of the present invention.

FIG. 2 is a block diagram illustrating a configuration of an MIH registration apparatus according to an exemplary embodiment of the present invention.

Referring to FIG. 2, the MIH registration apparatus includes a request receiver 210, a request transmitter 220, a response transmitter 230, and a response receiver 240.

The request receiver 210 receives an MIH registration request from an MIHF of a mobile terminal.

In an exemplary embodiment of the present invention, the request receiver 210 receives a re-registration request of a current identifier from the MIHF of the mobile terminal when an AP connecting with the mobile terminal is changed.

Specifically, when the AP connecting with the MIHF of the mobile terminal is changed, the request receiver 210 receives the re-registration request of the current identifier from the mobile terminal.

Also, when the AP is changed, the MIHF of the mobile terminal requests an MIHF of a serving network for the re-registration of the current identifier. Accordingly, the MIHF of the mobile terminal does not need to deregister the current identifier and register another identifier.

Accordingly, the re-registration request of the current identifier may reduce the time to connect with the current identifier.

In an exemplary embodiment of the present invention, APs before and after a connection with the mobile terminal is changed may be served by the same serving POS. Specifically, when the APs before and after the connection with the mobile terminal is changed are served by different serving POSs respectively, the MIHF of the mobile terminal should deregister current identifiers and then register new identifiers.

Also, the request receiver 210 may receive a re-registration request of identifiers associated with the MIH registration of the mobile terminal from the MIHF of the mobile terminal when the MIH registration of the mobile terminal and a lifetime of the identifiers associated therewith are expired.

When the MIH registration of the mobile terminal and the lifetime of identifiers associated therewith are expired, the MIHF of the mobile terminal may transmit the re-registration request of identifiers to the MIHF of the serving network at a predetermined time interval. Specifically, the request receiver 210 receives the re-registration request of identifiers from the MIHF of the mobile terminal at the predetermined time interval, and then re-registers the identifiers.

When the MIH registration of the mobile terminal and the lifetime of identifiers associated therewith are expired, the MIHF of the serving network may transmit a predetermined message to the mobile terminal to request the re-registration of identifiers. In this instance, the predetermined message may be transmitted to the mobile terminal at the predetermined time interval.

In an exemplary embodiment of the present invention, the request receiver 210 may receive the MIH registration request of the mobile terminal to the MIHF of the target network from the MIHF of the mobile terminal.

When the MIH registration request of the mobile terminal is received from the MIHF of the mobile terminal, the request transmitter 220 transmits the MIH registration request of the serving network to an MIHF of at least one candidate network corresponding to the serving network.

In an exemplary embodiment of the present invention, the serving network indicates a network which directly connects with the mobile terminal. The candidate networks indicate networks which the mobile terminal may move to in the serving network. Specifically, the candidate networks directly connect with the serving network.

In an exemplary embodiment of the present invention, the request transmitter 220 may transmit transmission information to the mobile terminal. In this instance, the transmission information includes information about transmission of the MIH registration request of the serving network to the candidate networks.

Also, when the MIH registration request of the mobile terminal to the MIHF of the target network is received from the MIHF of the mobile terminal, the request transmitter 220 may transmit the MIH registration request of the mobile terminal to the MIHF of the target network.

The response receiver 240 receives a response to the MIH registration request of the serving network from each of the MIHFs of the candidate networks.

Specifically, the MIHFs of the candidate networks are registered in the MIHF of the serving network, and the MIHF of the serving network is registered in each of the MIHFs of the candidate networks based on the responses of the candidate networks to the MIH registration request of the serving network and the MIH registration request of the serving network.

In an exemplary embodiment of the present invention, the response receiver 240 may receive the response to the MIH registration request of the mobile terminal from the MIHF of the target network.

The response transmitter 230 transmits the response to the MIH registration request of the mobile terminal to the MIHF of the mobile terminal.

Also, the response transmitter 230 may transmit to the mobile terminal a response of the serving network to the MIH registration request of the mobile terminal and a response of each of the candidate networks to the MIH registration request of the serving network.

Specifically, the response transmitter 230 transmits, to the MIHF of the mobile terminal, an MIH registration request response result of the serving network which receives the MIH registration request of the mobile terminal, and an MIH registration request response result of each of the candidate networks with respect to the MIH registration request of the serving network.

In an exemplary embodiment of the present invention, when the request receiver 210 receives an MIH re-registration request of the mobile terminal, the response transmitter 230 may transmit a response to the MIH re-registration request of the mobile terminal to the MIHF of the mobile terminal.

Specifically, the response transmitter 230 transmits to the mobile terminal a response result with respect to the MIH re-registration request received from the MIHF of the mobile terminal.

In an exemplary embodiment of the present invention, the response transmitter 230 may transmit the response to the MIH registration request of the mobile terminal, which was received from the MIHF of the target network, to the MIHF of the mobile terminal.

The MIH re-registration request of the mobile terminal will be described with reference to FIG. 3.

Figure 3:
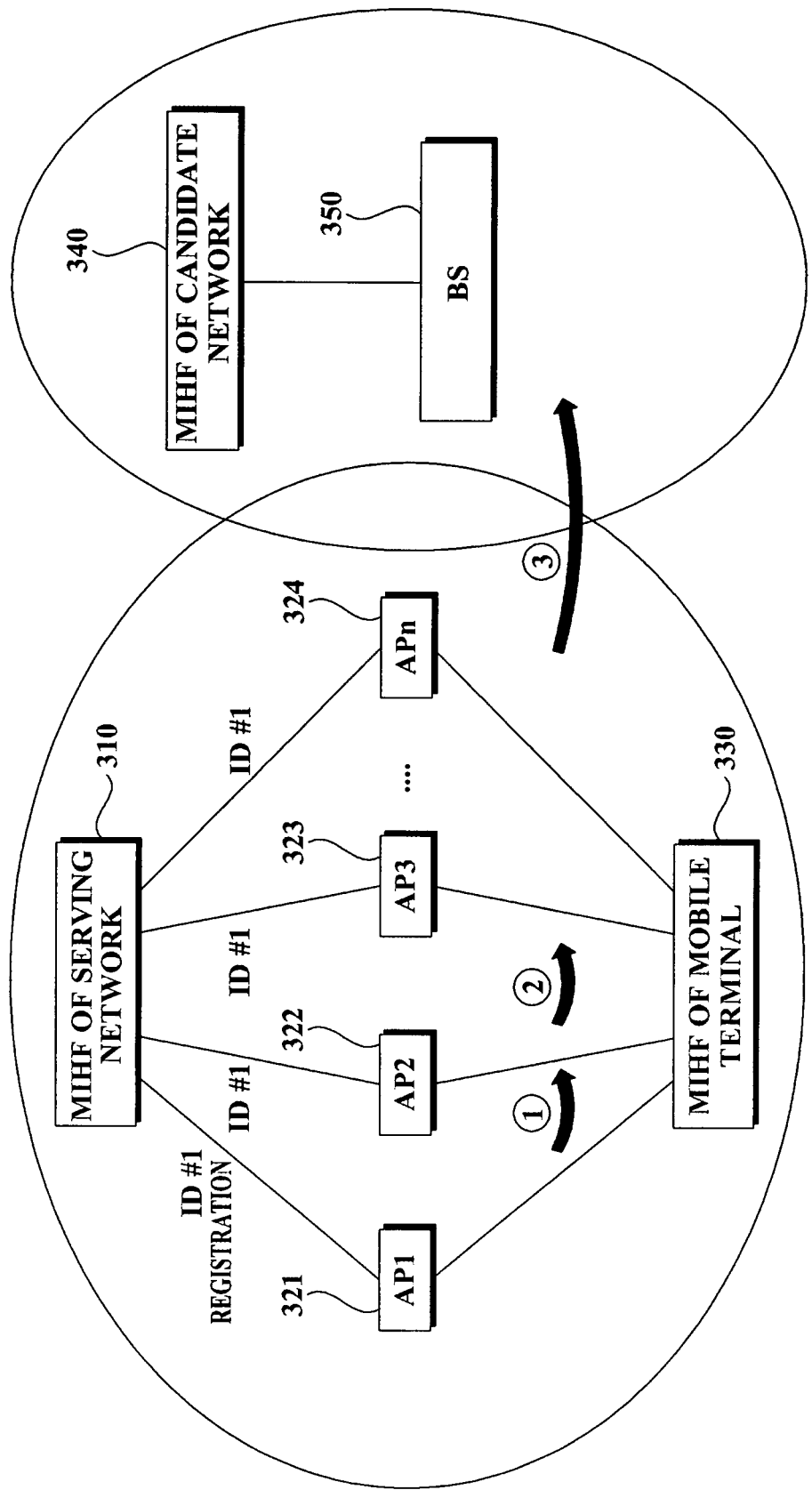
FIG. 3 illustrates an example of describing an MIH re-registration by an MIH registration apparatus according to an exemplary embodiment of the present invention.

FIG. 3 illustrates an example of describing an MIH re-registration by an MIH registration apparatus according to an exemplary embodiment of the present invention.

As shown in FIG. 3, when an MIHF of a mobile terminal 330 connects with an MIHF of a serving network 310 via AP1 321, the MIHF of the mobile terminal 330 is registered as ID #1.

Specifically, the MIHF of the mobile terminal 330 requests the MIHF of the serving network 310 for a registration of ID#1 via AP1 321, and the MIHF of the serving network 310 transmits the response to the registration request. Accordingly, the registration between the MIHF of the serving network 310 and the MIHF of the mobile terminal 330 is registered as ID#1.

When an AP connecting with the MIHF of the mobile terminal 330 is changed from AP1 321 into AP2 322 as shown in ①, the MIHF of the mobile terminal 330 requests the MIHF of the serving network 310 for a re-registration of ID#1 and the MIHF of the serving network 310 receives the re-registration request and maintains ID#1 as is.

Also, when the AP connecting with the MIHF of the mobile terminal 330 is changed again from AP2 322 into AP3 323 as shown in ②, the MIHF of the mobile terminal 330 requests the MIHF of the serving network 310 for the re-registration of ID#1, and the MIHF of the serving network 310 receives the re-registration request and maintains ID#1 as is.

AP1 321, AP2 322, AP3 323, ..., and APn 324 are served by the MIHF of the serving network 310, that is, the same serving POS. Accordingly, although the AP connecting with the MIHF of the mobile terminal 330 is changed, the MIHF of the mobile terminal 330 requests the MIHF of the serving network 310 for a re-registration of a current identifier and maintains the current identifier without performing a deregistration procedure of the current identifier and a registration procedure of a new identifier.

When the mobile terminal moves from the serving network to a candidate network and thereby connects with a base station (BS) 350 in APn 324 as shown in ③, that is, when the MIHF of the mobile terminal 330 connects with an MIHF of a candidate network 340 via the BS 350, the mobile terminal should deregister ID#1 corresponding to the current identifier and then register a new identifier.

Figure 4:
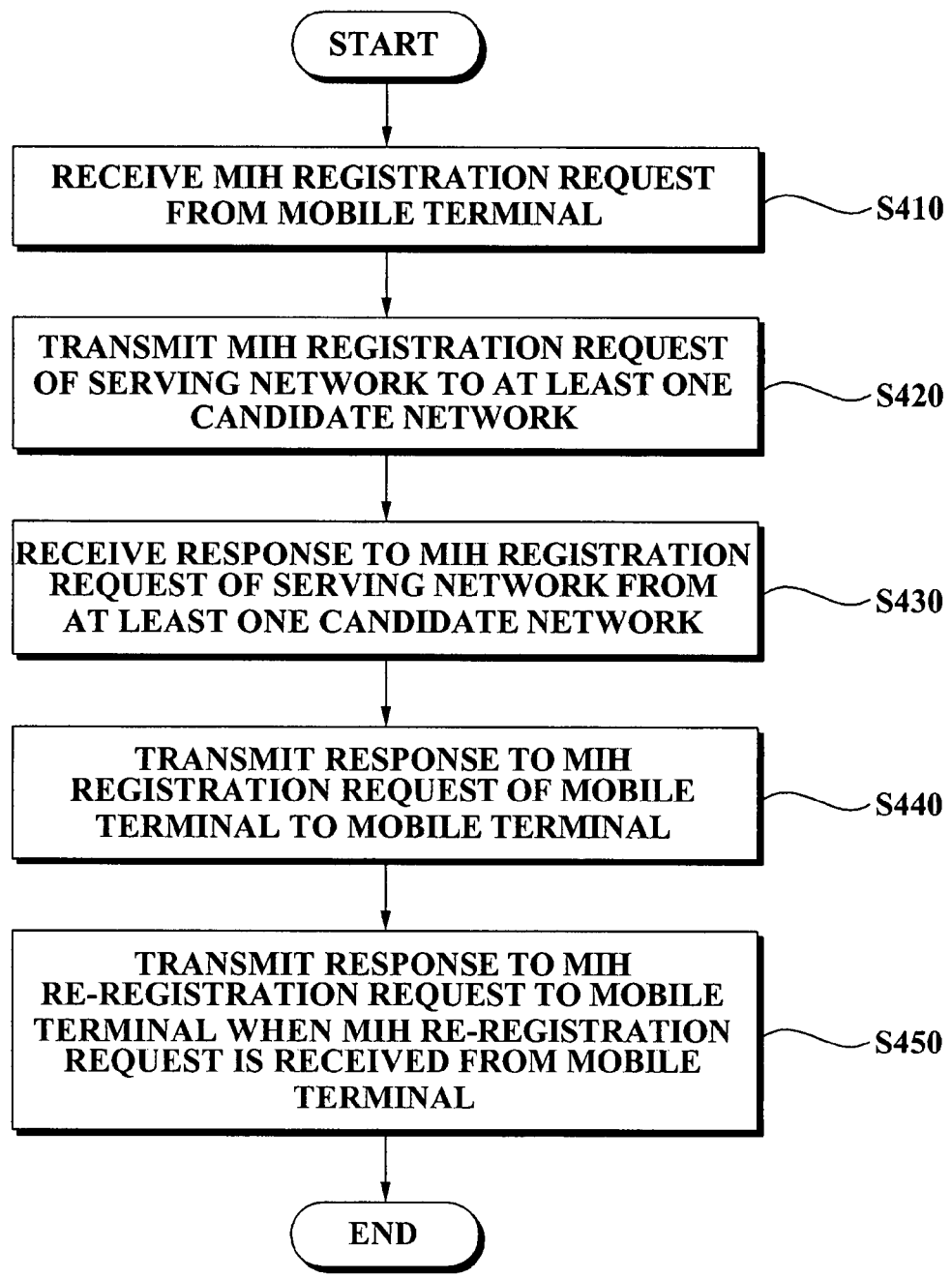
FIG. 4 is a flowchart illustrating a method of registering an MIH according to an exemplary embodiment of the present invention.

FIG. 4 is a flowchart illustrating a method of registering an MIH according to an exemplary embodiment of the present invention.

Referring to FIG. 4, in step S410, an MIHF of a serving network receives an MIH registration request from an MIHF of a mobile terminal.

In step S420, the MIHF of the serving network transmits an MIH registration request of the serving network to at least one candidate network when the MIH registration request is received from the mobile terminal. In this instance, the at least one candidate network corresponds to the serving network.

Also, the MIHF of the serving network may transmit transmission information to the mobile terminal. In this instance, the transmission information includes information about transmission of the MIH registration request of the serving network to the at least one candidate network.

In step S430, the MIHF of the serving network receives a response to the MIH registration request of the serving network from each of the at least one candidate network.

As described above, in steps S420 and S430, the MIH registration between the MIHF of the serving network and the MIHF of each of the at least one candidate network is performed.

Specifically, the MIHF of the at least one candidate network is registered in the MIHF of the serving network and the MIHF of the serving network is registered in the MIHF of the at least one candidate network based on the MIH registration request and response between the MIHF of the serving network and the MIHF of the at least one candidate network.

In step S440, when the response to the MIH registration request of the serving network is received from the MIHF of each of the at least one candidate network, the MIHF of the serving network transmits the response to the MIH registration request of the mobile terminal to the MIHF of the mobile terminal.

In an exemplary embodiment of the present invention, the MIHF of the serving network may transmit to the MIHF of the mobile terminal a response of the serving network to the MIH registration request of the mobile terminal and a response of the at least one candidate network to the MIH registration request of the serving network.

Through the above operation, a registration procedure between the MIHF of the mobile terminal and the MIHF of the serving network may be performed. Also, a registration procedure between the MIHF of the serving network and the MIHF of the at least one candidate network may be performed.

Specifically, a predetermined message may be transmitted from the MIHF of the serving network to the MIHF of the at least one candidate network by performing the registration procedure between the MIHF of the serving network and the MIHF of the at least one candidate network.

In step S450, when the MIH re-registration request is received from the MIHF of the mobile terminal, the MIHF of the serving network transmits the response to the MIH re-registration request of the mobile terminal to the MIHF of the mobile terminal.

Also, when the AP connecting with the MIHF of the mobile terminal is changed, the MIHF of the mobile terminal may request the MIHF of the serving network for the re-registration request of the current identifier.

Specifically, when the AP connecting with the MIHF of the mobile terminal is changed, the MIHF of the serving network receives the MIH re-registration request of the current identifier from the MIHF of the mobile terminal.

In an exemplary embodiment of the present invention, APs before and after a connection with the MIHF of the mobile terminal is changed may be served by the same serving POS. As described above, only when the APs, the APs being before and after the connection with the MIHF of the mobile terminal is changed, are served by the same serving POS, will the MIHF of the mobile terminal request the MIHF of the serving network for the MIH re-registration of the current identifier. Specifically, when the APs before and after the connection with the MIHF of the mobile terminal is changed are served by different serving POSs, the MIHF of the mobile terminal deregisters existing identifiers and registers new identifiers.

In an exemplary embodiment of the present invention, when the MIH registration of the mobile terminal and a lifetime of the identifiers associated therewith are expired, the MIHF of the mobile terminal may request the MIHF of the serving network for the re-registration of the identifiers.

Also, when the MIH registration of the mobile terminal and the lifetime of identifiers associated therewith are expired, the MIHF of the mobile terminal may transmit the re-registration request of the identifiers to the MIHF of the serving network at a predetermined time interval.

Also, when the MIH registration of the mobile terminal and the lifetime of identifiers associated therewith are expired, the MIHF of the serving network may transmit a predetermined message to the MIHF of the mobile terminal to request the re-registration of identifiers. In this instance, the predetermined message may be transmitted to the mobile terminal at the predetermined time interval.

Also, the MIH registration method according to an exemplary embodiment of the present invention may register the MIH of the mobile terminal in the MIHF of the target network.

Specifically, when the MIH registration request of the mobile terminal to the MIHF of the target network is received from the MIHF of the mobile terminal, the MIHF of the serving network transmits the MIH registration request of the mobile terminal to the MIHF of the target network.

Also, when a response to the MIH registration request of the mobile terminal is received from the MIHF of the target network, the MIHF of the serving network transmits the response to the MIH registration request of the mobile terminal to the MIHF of the mobile terminal.

Through the above operation, the MIH of the mobile terminal may be registered in the MIHF of the target network.

Figure 5:
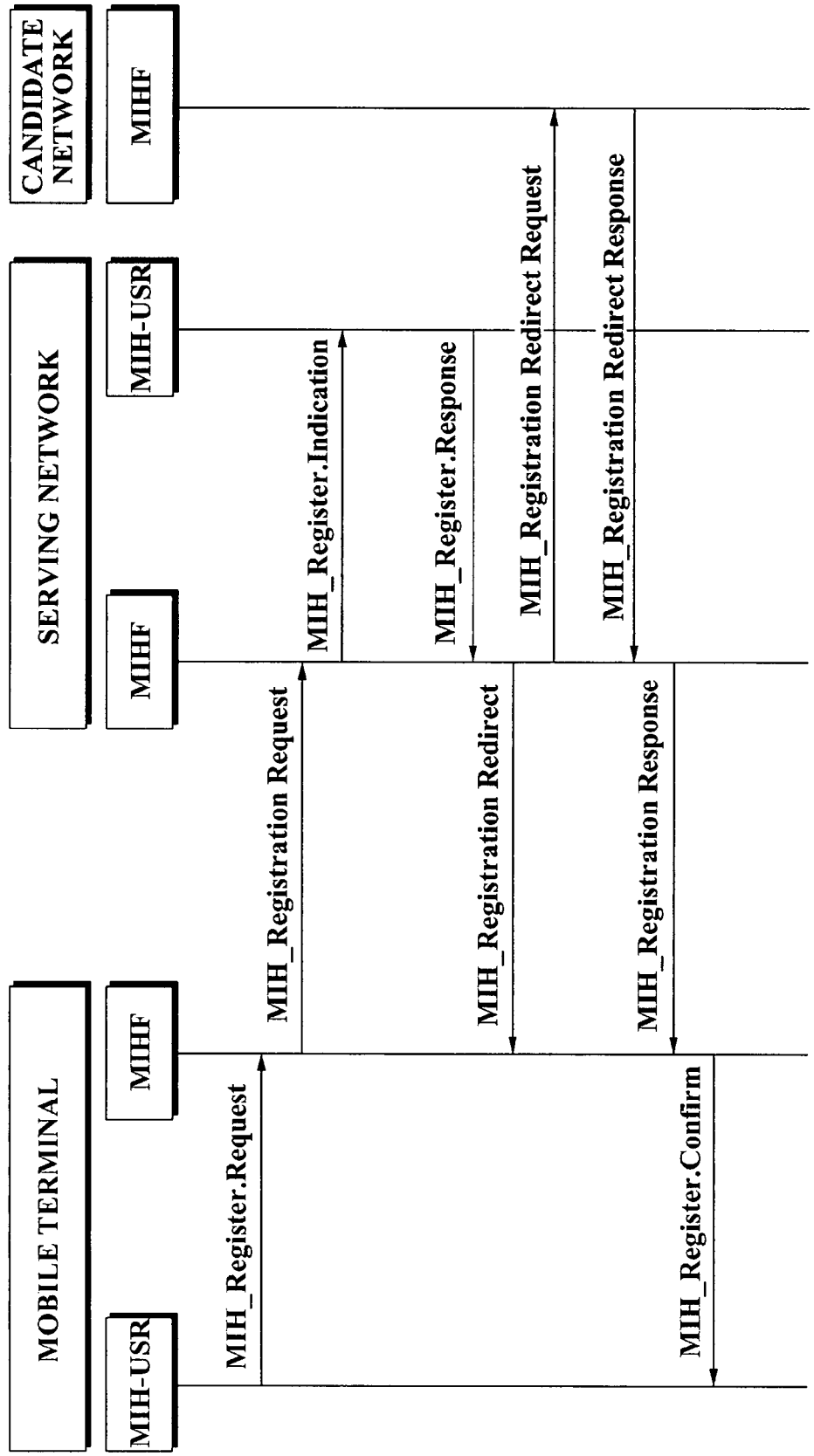
FIG. 5 illustrates a method of registering an MIH according to an exemplary embodiment of the present invention.

FIG. 5 illustrates a method of registering an MIH according to an exemplary embodiment of the present invention.

In FIG. 5, an operational flow in an MIH registration system with respect to steps S410 through S440 of FIG. 4, according to an exemplary embodiment of the invention, is shown in detail.

Referring to FIG. 5, an MIHF of a mobile terminal transmits an MIH registration request (MIH_Registration Request) message of the mobile terminal to an MIHF of a serving network based on an MIH registration request (MIH_Register Request) message received from an MIH user (MIH-USR) of the mobile terminal.

In this instance, the MIH-USR is included in an upper layer of the MIHF.

The MIHF of the serving network receives the MIH_Registration Request message. Also, the MIHF of the serving network transfers information (MIH_Register.Indication), indicating that the MIH_Registration Request message is received to the MIH-USR and receives a response MIH_Register.Response from the MIH-USR.

Also, the MIHF of the serving network transmits to the MIHF of the mobile terminal a transmission information (MIH_Registration Redirect) message of the MIH registration request of the serving network to a candidate network. Also, the MIHF of the serving network transmits an MIH registration request (MIH_Registration Redirect Request) message of the serving network to the candidate network.

Also, the MIHF of the serving network receives a response (MIH_Registration Redirect Response) message to the MIH registration request of the serving network from the MIHF of the candidate network, and transmits, to the MIHF of the mobile terminal a response (MIH_Registration Response) message to the MIH registration request of the mobile terminal.

The MIHF of the mobile terminal transmits a result (MIH_Register.Confirm) of the MIH registration request of the mobile terminal to the MIH-USR.

Through the above operation, a registration procedure between the MIHF of the mobile terminal and the MIHF of the serving network is performed. Also, a registration procedure between the MIHF of the serving network and the MIHF of the candidate network is performed.

FIG. 5 illustrates the registration procedure between the MIHF of the serving network and the MIHF of one candidate network. However, exemplary embodiments of the present invention are not limited thereto. Specifically, in the case of at least one candidate network, a registration procedure between the MIHF of the serving network and the MIHF of the at least one candidate network may be performed through the same registration procedure as described above.

Figure 6:
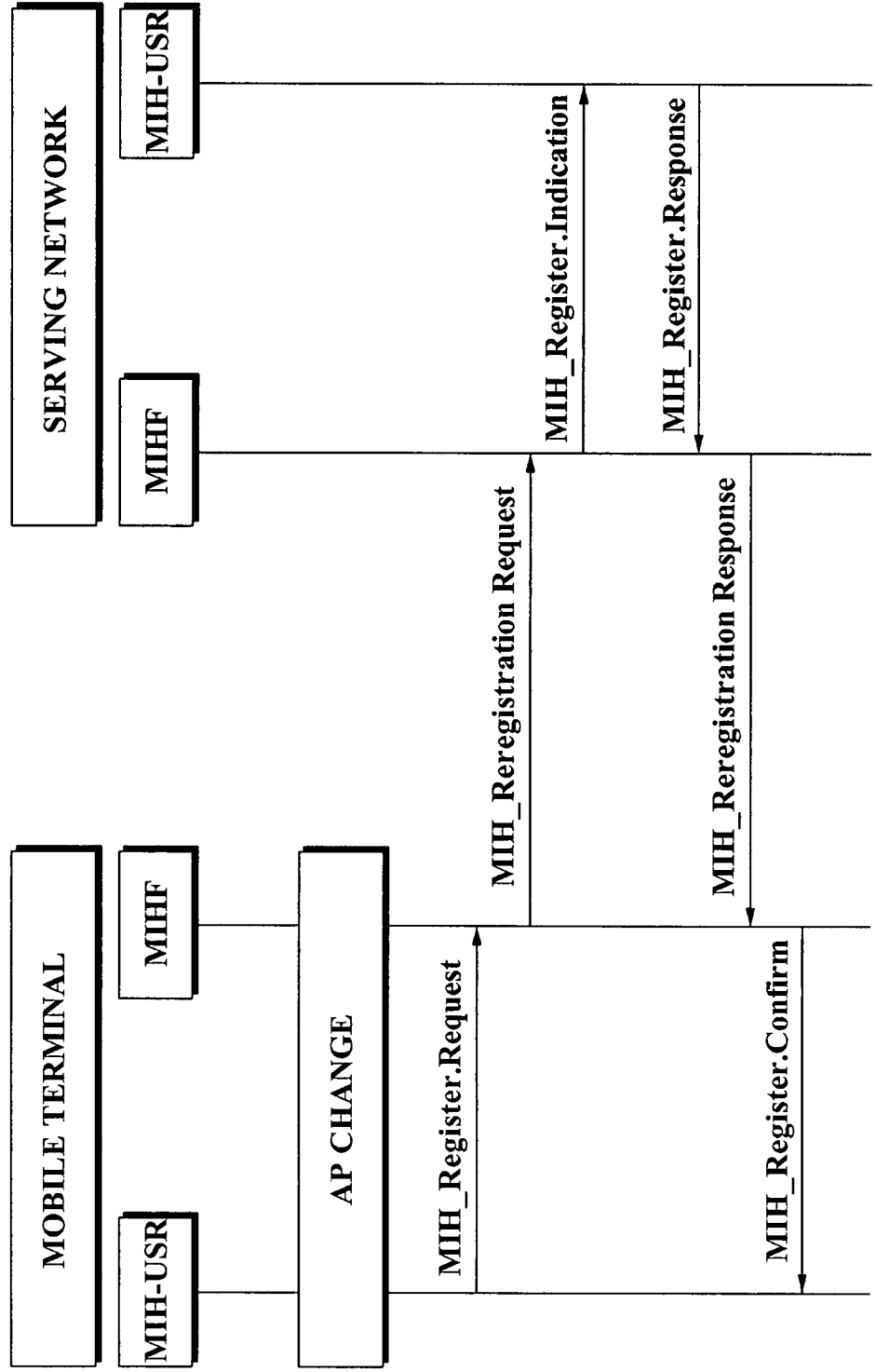
FIG. 6 illustrates step S450 of FIG. 4, according to an exemplary embodiment of the present invention, in detail.

FIG. 6 illustrates step S450 of FIG. 4, according to an exemplary embodiment of the present invention, in detail.

Referring to FIG. 6, when an AP is changed, that is, when point of attachment (POA) is changed, an MIHF of a mobile terminal transmits an MIH re-registration request (MIH_ReRegistration Request) message of the mobile terminal about a current identifier to an MIHF of a serving network based on an MIH registration request (MIH_Register.Request) received from an MIH-USR.

The MIHF of the serving network receives the MIH re-registration request message of the mobile terminal. Also, the MIHF of the serving network transmits information (MIH_Register.Indication) indicating that the MIH re-registration request message of the mobile terminal is received to the MIH-USR, and receives a response (MIH_Register.Response) from the MIH-USR.

Also, the MIHF of the serving network transmits to the MIHF of the mobile terminal a response (MIH_ReRegistration Response) message to the MIH re-registration request of the mobile terminal.

Also, the MIHF of the mobile terminal transmits a result (MIH_Register.Confirm) of the MIH re-registration request of the mobile terminal to the MIH-USR.

The MIH registration method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. The computer-readable recording medium can also be distributed over network-coupled computer systems so that the computer-readable code is stored and executed in a distributed fashion. Examples of program instructions include both machine code, such as produced by a compiler, and files containing higher level code that may be executed by the computer using an interpreter. Also, functional programs, codes, and code segments for accomplishing the present invention can be easily construed as within the scope of the invention by programmers skilled in the art to which the present invention pertains. The described hardware devices may be configured to act as one or more software modules in order to perform the operations of the above-described exemplary embodiments of the present invention.

According to exemplary embodiments of the present invention, there is provided an MIH registration method and apparatus which can define a registration procedure between an MIHF of a serving network and MIHFs of candidate networks corresponding to the serving network, and thereby perform communication between the serving network and the candidate networks.

Also, according to exemplary embodiments of the present invention, it is possible to perform a re-registration procedure of an identifier between an MIHF of a mobile terminal and an MIHF of a serving network when an AP is changed.

Also, according to exemplary embodiments of the present invention, it is possible to perform a re-registration procedure of an identifier between an MIHF of a mobile terminal and an MIHF of a serving network and thereby reduce a registration time between the MIHF of the mobile terminal and the MIHF of the serving network.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of registering a Media Independent Handover (MIH), the method comprising the steps of:
    transmitting, by a serving network, an MIH registration request of the serving network to at least one candidate network when the serving network receives an MIH registration request from a mobile terminal, wherein the at least one candidate network corresponds to the serving network;
    receiving, by the serving network, a response to the MIH registration request of the serving network from each of the at least one candidate network; and
    transmitting, by the serving network, a response to the MIH registration request of the mobile terminal to the mobile terminal wherein re-registration of a current identifier is performed without deregistration of the current identifier and registration of a new identifier.

2. The method of claim 1, wherein the serving network transmits transmission information to the mobile terminal, the transmission information comprising information about transmission of the MIH registration request of the serving network to the at least one candidate network.

3. The method of claim 1, wherein the response to the MIH registration request of the mobile terminal comprises a response of the serving network to the MIH registration request of the mobile terminal and a response of the at least one candidate network to the MIH registration request of the serving network.

4. The method of claim 1, further comprising the step of:
    receiving, by the serving network, a re-registration request of the current identifier from the mobile terminal when an access point connecting with the mobile terminal is changed.

5. The method of claim 4, wherein access points before and after a connection with the mobile terminal is changed are served by identical serving Point of Service (POS).

6. The method of claim 4, wherein the MIH of the mobile terminal requests, due to the change of the access point, a MIH function of the serving network for the re-registration of the current identifier without performing a deregistration procedure of the current identifier and also without performing a registration procedure of a new identifier.

7. The method of claim 1, further comprising the step of:
    receiving, by the serving network, a re-registration request of identifiers associated with the MIH registration of the mobile terminal, from the mobile terminal, when the MIH registration of the mobile terminal and a lifetime of the identifiers associated therewith are expired.

8. The method of claim 1, further comprising the step of:
    pre-registering the MIH function of the mobile terminal in the MIH function of a target network before moving to the target network.

9. The method of claim 1, further comprising:
    transmitting, by the serving network, the MIH registration request of the mobile terminal to a predetermined candidate network of the at least one candidate network when an MIH registration request of the predetermined candidate network is received from the mobile terminal;
    receiving, by the serving network, a response to the MIH registration request of the mobile terminal from the predetermined candidate network; and
    transmitting, by the serving network, the response to the MIH registration request of the mobile terminal to the mobile terminal.

10. A non-transitory computer-readable recording medium having stored thereon instructions for implementing a method of registering a Media Independent Handover (MIH), the instructions comprising:
    a first set of instructions for transmitting, by a serving network, an MIH registration request of the serving network to at least one candidate network when the serving network receives an MIH registration request from a mobile terminal, the at least one candidate network corresponding to the serving network;
    a second set of instructions for receiving, by the serving network, a response to the MIH registration request of the serving network from each of the at least one candidate network; and
    a third set of instructions for transmitting, by the serving network, a response to the MIH registration request of the mobile terminal to the mobile terminal wherein a re-registration of a current identifier is performed without a deregistration of the current identifier and registration of a new identifier.

11. An apparatus for registering an MIH, the apparatus comprising:
    a request transmitter configured to transmit an MIH registration request of the serving network to at least one candidate network when the serving network receives an MIH registration request from a mobile terminal, wherein the at least one candidate network corresponds to the serving network;
    a response receiver configured to receive a response to the MIH registration request of the serving network from each of the at least one candidate network; and
    a response transmitter configured to transmit a response to the MIH registration request of the mobile terminal to the mobile terminal,
    wherein the request transmitter, the response receiver, and the response transmitter comprise hardware wherein a re-registration of a current identifier is performed without a deregistration of the current identifier and re is ration of a new identifier.

12. The apparatus of claim 11, wherein the request transmitter transmits transmission information to the mobile terminal, the transmission information comprising information about transmission of the MIH registration request of the serving network to the at least one candidate network.

13. The apparatus of claim 11, wherein the response transmitter transmits a response of the serving network to the MIH registration request of the mobile terminal and a response of the at least one candidate network to the MIH registration request of the serving network, to the mobile terminal.

14. The apparatus of claim 11, further comprising:
    a request receiver for receiving a re-registration request of the current identifier from the mobile terminal when an access point connecting with the mobile terminal is changed.

15. The apparatus of claim 14, wherein access points before and after a connection with the mobile terminal is changed are served by identical serving Point of Service (POS).

16. The apparatus of claim 14, wherein the MIH of the mobile terminal requests, due to the change of the access point, a MIH function of the serving network for the re-registration of the current identifier without performing a deregistration procedure of the current identifier and also without performing a registration procedure of a new identifier.

17. The apparatus of claim 11, further comprising:
a request receiver for receiving a re-registration request of identifiers associated with the MIH registration of the mobile terminal, from the mobile terminal, when the MIH registration of the mobile terminal and a lifetime of the identifiers associated therewith are expired.

18. The apparatus of claim 11, wherein the MIH function of the target network pre-registers the MIH function of the mobile terminal in the MIH function of a target network before moving to the target network.

19. The apparatus of claim 11, wherein:
the request transmitter transmits the MIH registration request of the mobile terminal to a predetermined candidate network of the at least one candidate network when an MIH registration request of the predetermined candidate network is received from the mobile terminal,
the response receiver receives a response to the MIH registration request of the mobile terminal from the predetermined candidate network, and
the response transmitter transmits the response to the MIH registration request of the mobile terminal to the mobile terminal.

* * * * *